United States Patent [19]

Krieter et al.

[11] 4,316,051
[45] Feb. 16, 1982

[54] PARTITION INSULATOR HAVING A PREDETERMINED RUPTURE BEHAVIOR

[75] Inventors: Georg-Heinz Krieter, Wurenlos; Gerhard Mauthe, Birmenstorf, both of Switzerland

[73] Assignee: BBC Brown, Boveri & Company, Ltd., Baden, Switzerland

[21] Appl. No.: 19,601

[22] Filed: Mar. 12, 1979

[30] Foreign Application Priority Data

Mar. 13, 1978 [CH] Switzerland .................... 2689/78

[51] Int. Cl.³ .................... H01B 17/26; H02B 13/02
[52] U.S. Cl. .................... 174/11 R; 137/68 R; 174/22 C; 174/28; 220/89 A
[58] Field of Search ........... 174/16 B, 21 C, 22 C, 174/28, 11 R, 11 BH; 137/68 R, 797; 220/89 A, 207, 300

[56] References Cited

U.S. PATENT DOCUMENTS

| 564,812 | 7/1896 | Winne | 220/89 A |
|---|---|---|---|
| 1,584,523 | 5/1926 | Egbert | 220/89 A |
| 1,959,822 | 5/1934 | Greve | 137/68 R X |
| 3,331,911 | 7/1967 | Whitehead | 174/28 X |
| 3,652,778 | 3/1972 | Sakai | 174/28 |
| 3,906,149 | 9/1975 | Hashoff et al. | 174/28 X |
| 4,096,345 | 6/1978 | Kemeny | 174/28 X |

FOREIGN PATENT DOCUMENTS

| 2210626 | 9/1973 | Fed. Rep. of Germany ........ 174/11 BH |
| 2526671 | 12/1976 | Fed. Rep. of Germany .... 174/22 C |
| 464321 | 12/1968 | Switzerland . |

*Primary Examiner*—Laramie E. Askin
*Attorney, Agent, or Firm*—Burns, Doane, Swecker & Mathis

[57] ABSTRACT

A partition insulator is disclosed having a seating in at least one insulator holder. A specific predetermined rupture behavior is provided for the partition insulator as a result of outside forces acting on the insulator at a specific quantity and direction such as, for example, gas pressure. A corresponding support (or gripping or solid gripping) of the partition insulator is provided whereby at least on the insulator, on the insulator holder or between these two parts, bearing points (or bearings) are arranged in a suitably distributed manner. The gripping of the partition insulator is accomplished herewith by the insulator holder alone or by both the insulator holder and a fastening ring which holds the partition insulator together by both threaded bolts and nuts. The partition insulator is preferably used as a pressure relief device in pressurized gas-insulated high-voltage switchgears having a metal switchgear casing. Mutually gastight individual compartments of the switchgear casing are divided by pressure relief devices whereby, in the most simple manner, a pressure-oriented graduation of the individual compartments may be achieved.

15 Claims, 15 Drawing Figures

PARTITION INSULATOR HAVING A PREDETERMINED RUPTURE BEHAVIOR

BACKGROUND AND SUMMARY OF THE PRESENT INVENTION

The present invention relates generally to a partition insulator having a seating in at least one insulator holder.

As discussed in the description introduction of CH-PS No. 464,321, it is known that the inside pressure of an individual compartment (for example, of a pressurized gas-insulated, metal-cased, high-voltage switchgear having individual compartments which are divided in a gas-tight manner by partition walls), rises relatively rapidly if an undesired electric arc appears as a result of any kind of disturbance. In order to control such an increase in the inside pressure and to thereby make an explosion of the metal casing impossible, it is known to arrange partition walls made from insulators as partition insulators. The walls have a stability such that they explode in the case of a bursting strength of about one-third of that pressure at which the metal casing enclosing the partition insulators bursts.

When an undesired electric arc appears within an individual compartment, one or both of the partition insulators bordering on the individual compartment may first rupture, owing to the ensuing increase in inside pressure. In this way, the pressure increase can now only occur within the greater volume and a pressure relief occurs. The bursting of yet another partition wall can still occur, however, although the electric arc has stopped, due to the (slower) increase in pressure in the greater volume (due to the rupture of the abovementioned partition insulator).

It is further proposed to limit the area of damage according to CH-PS No. 464,321 by arranging the partition insulators at points located between certain groups of individual compartments, the partition insulators having approximately the same bursting strength as the metal casing. In this way, however, partition insulators having different bursting strengths are required.

Further, it is well known from DT-OS No. 2 210,626 how to construct an insulating pin for pressurized gas-insulated, metal-cased, high-voltage switch-gears. The insulating pin serves simultaneously as a partition element between sequentially located pressurized gas-filled individual compartments which receive components in such switchgears. The insulating pin is weakened (in cross-section) at one or several points so that the pin will burst at these points in the event of increased pressures. The bearing strength of the pin, however, is maintained. The production of such insulator pins, however, requires complex and therefore expensive casting molds.

The reason for the complexity and expense involved with the insulator pins lies mainly in the fact that the insulator pins have to be precisely weakened in cross section at one or several points such that the weak points do not react in an undesired manner too early (e.g. with only slightly increased pressures). In that event, the high-voltage switchgear would be placed unnecessarily out of operation. The weak points, furthermore, must not allow a greatly increased pressure because the desired protection of the high-voltage switchgear would therefore not be guaranteed. Such an insulator pin does not only include an inhomogeneity in structure (at each of the points) but can also be inhomogeneous in material because the points (provided with a decreased cross section) can be made of a different material than the rest of the pin. Such insulator pins feature a wide range of reaction.

The pins have a further disadvantage, however, since it is possible to damage the pin at the sensitive weak points during handling. Even if the abovementioned considerations with respect to the insulator pin are disregarded, use of insulator pins is undesirable since identical insulator pins may have differing stabilities.

The task which serves as a basis for the present invention is to guarantee in the most simple way a predetermined insulator rupture or burst behavior as a function of the size and direction of the external forces acting on the partition insulator. This behavior is most preferably provided in the case of a partition insulator of uniform construction arranged in at least one insulator holder, and with application of only one specific insulator type and size class.

The solution of the task is made with regard to a partition insulator having a constructional development essentially in accordance with the present invention.

With a partition insulator according to the present invention, even when using only one insulator type and size class (without change of the insulator), it is entirely possible to correspondingly predetermine, as desired, the insulator predetermined rupture or the insulator rupture or burst behavior. These behaviors may be predetermined by an arrangement of bearing points, bearings or intermediate bearings between the partition insulator and the insulator holder. Even a relatively simple shape change of either the flange of the insulator holder and/or the partition insulator flange by the arrangement of the bearing points or bearings on the edges of the flange of the insulator holder facing the insulator and/or of the edges of the flange of the partition insulator facing the insulator holder brings about in a simple manner a determination of the partition insulator predetermined rupture.

With partition insulators and insulator holders constructed in this way, (especially in the case of pressurized gas-insulated, high-voltage switchgears with distribution of the respective metal equipment casing into mutually gas-tight divided individual compartments with a varying admissible upper limiting pressure of the insulating gas), there results a first advantage that adjacent individual compartments can be divided by a single partition insulator which reacts direction-dependently to varying bursting strengths. This advantage will enable one to realize, in the most simple way, a pressure-oriented graduation of the individual compartments of the respective switchgear casing.

It is especially advantageous to provide the partition insulator with a particular insulator holder according to the present invention because it is thereby possible to have a further varied differentiation of the insulator predetermined rupture or burst behavior in the most simple manner without a change of the partition insulator. In comparison with a partition insulator which is only supported on an edge, considerably smaller bends and (in the case of a disk-shaped or a circular plate-shaped basic form), smaller radial and tangential stresses appear in the case of a partition insulator having a form-locking and/or power-locking arrangement (or gripping or fixed-gripping) in an insulator holder. In this way, in the case of one and the same partition insulator including an insulator holder, an extension of the range of the pressure load capacity (with regard to the insulator rupture or burst behavior) may be made depending on the seating of the partition insulator.

In the case of a preferred form of construction, the partition insulator is to be constructed with an insulator holder in order (if special dimensions of the insulator are disregarded) for its predetermined rupture behavior to be varied advantageously as a function of a bendable part of the partition insulator having a free diameter between the bearing points or bearings.

The assumption that the elastic behavior of the partition insulator is herewith essentially a function of the ratio of the insulator thickness with respect to the abovementioned respective free diameter and further a function of the other dimensions of cast fittings in the center of the insulator (not depicted or described here in detail) as well as of the actual insulator shape deviating from the disk or circular plate shape, is herewith assumed as without question and the slight deviations resulting therefrom are disregarded.

It is essentially advantageous to construct the partition insulator in order thereby to guarantee in the most simple manner an independent predetermined rupture or insulator rupture or burst behavior as a function of the direction and magnitude of the external force acting on the partition insulator (e.g. the gas pressure in the case of pressurized gas-insulated high-voltage switchgears).

In addition, it is advantageous to construct the partition insulator together with an insulator holder having an open slot between the insulator and holder in order to utilize, in the most simple manner for the partition insulator, at least the stress (or bending-oriented) advantages of an outside and inside free resting disk or circular plate. These advantages are realized in the case of one or several axial extensions of the free slot varying from the quantity or value 0 (that is, resulting from bearing points or bearings being located further from the middle or axis) in this most simple manner for the partition insulator.

Further advantages achieved with the present invention consist in the avoidance of a relatively great reaction distribution with respect to the insulator rupture or burst behavior whereby the reaction accuracy is achieved consistently with the present invention in a most simple manner. Above all, the advantages are achieved without worsening the properties of the partition as an insulator. In this way, no varying insulator stabilities (produced more particularly by insulator weak points and/or by utilization of differing insulator materials and which establish an easy damage capability of such insulators) necessarily result from the present invention. Even with respect to the manufacture, however, the subject of the present invention is quite advantageous since it can be cheaply produced by relatively simple casting molds.

As seen from both an overall and a specific standpoint, the present invention enables, above all, electrical arc protection to be both improvable and solution-oriented in a relatively simple manner with respect to metal-cased, high-voltage switchgears.

BRIEF DESCRIPTION OF THE DRAWINGS

With reference to the accompanying drawings, preferred embodiments of the present invention are illustrated wherein like members bear like reference numbers and wherein:

FIG. 7b is an enlarged view of a portion of the partition insulator of FIG. 7a;

FIG. 9b is an enlarged view of a portion of the partition insulator of FIG. 9a.

DETAILED DESCRIPTION OF THE PREFERRED EMBODIMENTS

Figure 1:
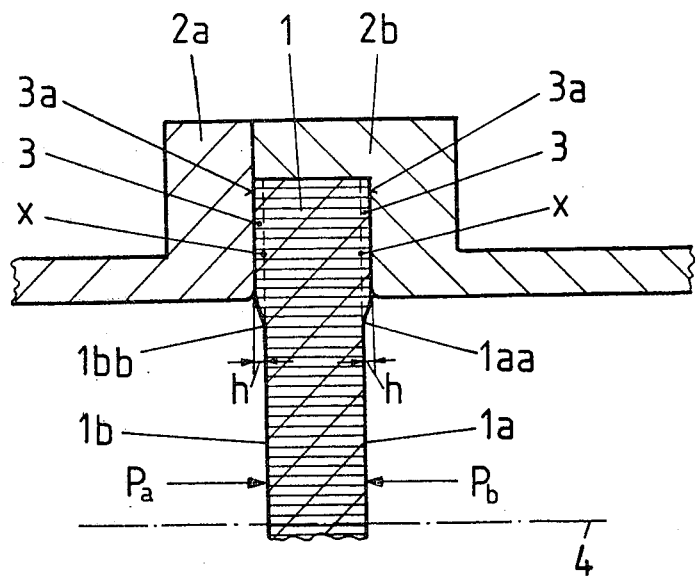
FIG. 1 is a cross sectional view of a portion of a partition insulator according to the present invention which partition insulator is provided with bearing surfaces on the edges of two front (or bearing) surfaces of the insulator and mounted in an insulator holder consisting of two parts.

With reference now to FIG. 1, a portion of an essentially disk-shaped partition insulator 1 includes a first front (or bearing) surface 1a and a second front (or bearing) surface 1b. A bearing 3 is provided at an edge 1aa of the first front surface 1a as well as at an edge 1bb of the second front surface 1b. The bearings 3 preferably have an essentially annular shape.

The bearings 3 have an axial height h and are arranged at points x of the edges 1aa, 1bb on the partition insulator 1 with the two points x forming planar annular surfaces of the partition insulator. The partition insulator 1 accordingly at least contacts a first part 2a of an insulator holder with an open front surface 3a of the one bearing 3 or at least contacts a second part 2b of the insulator holder with an open front surface 3a of the other bearing 3.

The two abovementioned open front surfaces 3a are of equal size and likewise feature and shape of planar rings having equal outside and inside diameters. If now the partition insulator 1 is acted upon unilaterally as symbolically indicated by arrow $P_a$ (for example, by gas pressure), it follows that a reaction behavior of the partition insulator 1 occurs which is mainly determined by the material, the thickness and the open inside diameter of the annular open front surfaces 3a of the partition insulator. When a pressure $P_b$ (directed contrary to $P_a$) likewise takes place unilaterally on the other side of the partition insulator 1 with equal intensity, it follows that the reaction behavior, (e.g. the stresses and the bending), correlate according to the absolute values with the first-mentioned reaction behavior.

A partition insulator 1 arranged symmetrically both with respect to cross section as well as to a central (dotted-dashed) axis 4 is defined accordingly with respect to the abovementioned pressure loads $P_a$ or $P_b$ by a pressure direction-dependent or similar behavior. In this way, when the burst limit of the partition insulator 1 is exceeded, the insulator breaks into a number of pieces depending upon the direction of the pressure $P_a$ or $P_b$ (either in the one or the opposite direction).

Figure 2:
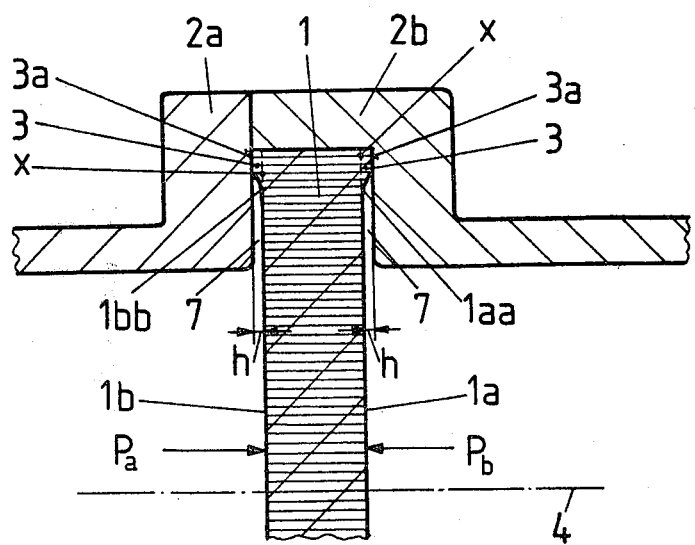
FIG. 2 is a cross-sectional view of a portion of another partition insulator according to the present invention wherein the bearings on the edges of the front surfaces are constructed considerably smaller and are at the same time arranged farther away from a (dash-dotted) center (or axis) of the partition insulator.

With reference now to FIG. 2, all members and positions correspond to the members and positions of FIG. 1, with the partition insulator 1 being constructed symmetrically with respect to its (cross-hatched) cross section as well as to its central (dotted-dashed) axis. Nevertheless, in comparison with the partition insulator of FIG. 1, the planar annular points x on which the annular bearings are arranged on the edges 1aa and 1bb of the first and the second front (or bearing) surfaces 1a, 1b are considerably smaller than those of FIG. 1. Since the bearings 3 are arranged as far to the outside as possible on the front surfaces 1a, 1b, the open front surfaces 3a are provided adjacent to the interior surfaces of the insulator holder 2a, 2b (in the case of an identical diameter of respective planar ring shape). Equal open slots 7 are provided between the partition insulator 1 and the insulator holders 2a, 2b. The open slots 7 permit a predetermined amount of free bending of the partition insulator 1 during exposure to pressure on either side of the partition insulator 1.

The result is that, in the case of an identical pressure load $P_a$ or $P_b$, a stronger reaction or greater stresses as well as a greater bending will occur in the partition insulator here than in case of the partition insulator of FIG. 1. If the gas pressure $P_a$ or $P_b$ now just corresponds to the bursting strength of the embodiment of the partition insulator according to FIG. 2, it follows that this embodiment exactly gives the solution for the bearing of the partition insulator in which the predetermined rupture of the insulator takes place for a gas pressure $P_a$ or $P_b$ specified according to quantity and direction.

Figure 3A:
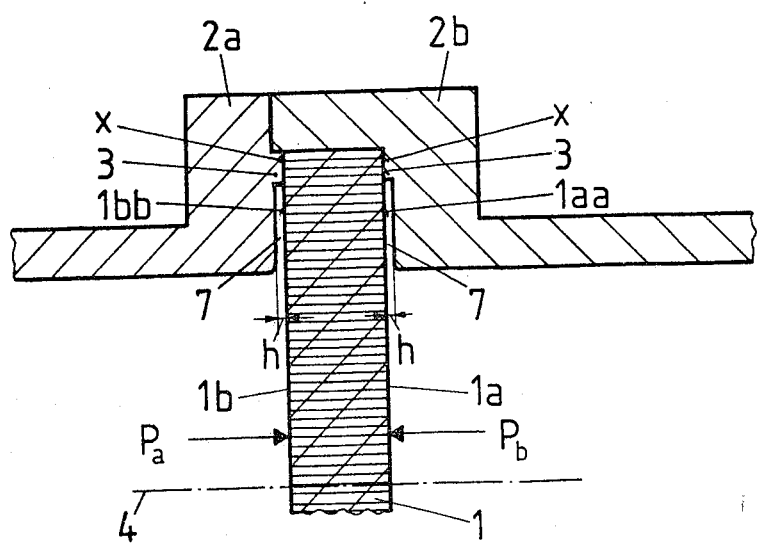
FIG. 3a is a cross-sectional view of a portion of a partition insulator according to the present invention wherein the bearings are provided on the two parts of the insulator holder rather than on the partition insulator.

The members and positions are denoted in FIG. 3a in a manner corresponding to FIGS. 1 and 2. As essential difference between the embodiment of FIG. 2, on the one hand, and that of FIG. 3a, on the other hand, is that the bearing points (or bearings) 3 are arranged, not at points x of edges 1aa or 1bb of the front (or bearing) surfaces 1a and 1b, but instead, are arranged on points y (see FIG. 3b) of the insulator holder 2a, 2b (located opposite to the points x). The embodiment of FIG. 3a nevertheless features a bursting behavior similar to the embodiment of FIG. 2.

Figures 3B, 4B:
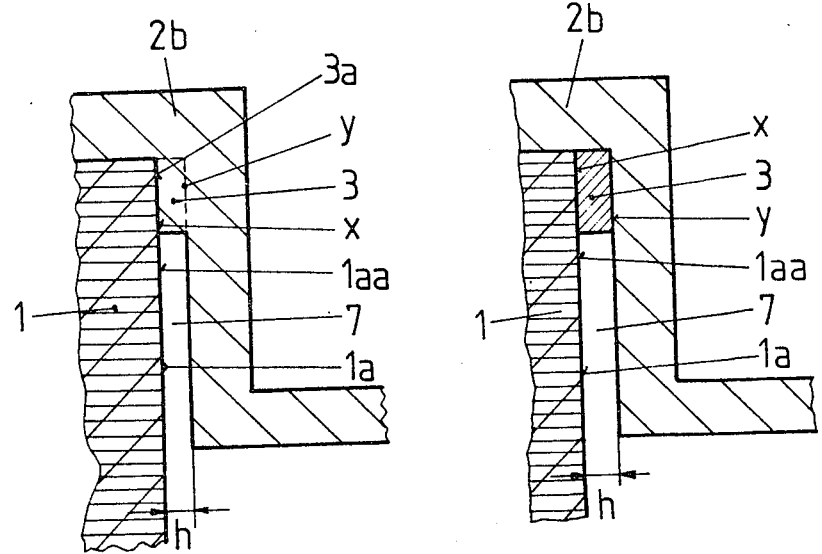
FIG. 3b is an enlarged view of a portion of the partition insulator of FIG. 3a including a bearing point (or bearing)
FIG. 4b is an enlarged view of a portion of the partition insulator of FIG. 4a including a bearing point (or bearing)

With reference now to FIG. 3b, the bearing 3 according to the embodiment of FIG. 3a (in contrast to the embodiment of FIG. 2) is arranged with open front surfaces 3a, not facing on the insulator holder 2a, 2b, but instead facing on the points y (located opposite the points x on the edges 1aa or 1bb of the partition insulator 1). The supporting effect of the bearings 3 is nevertheless essentially the same as in the embodiment of FIG. 2 since the open front surfaces 3a of the bearings 3 are (see FIG. 3a) equally as large as those of the embodiment of FIG. 2. The bearings have the shape of planar rings which are equal to one another and have equal outside and (open) inside diameters as in the embodiment of FIG. 2. In addition, the heights h of the bearings 3 correlate to one another. Equal open slots 7, as in the embodiment of FIG. 2 are provided between the partition insulators 1 and the insulator holders 2a, 2b.

Figure 4A:
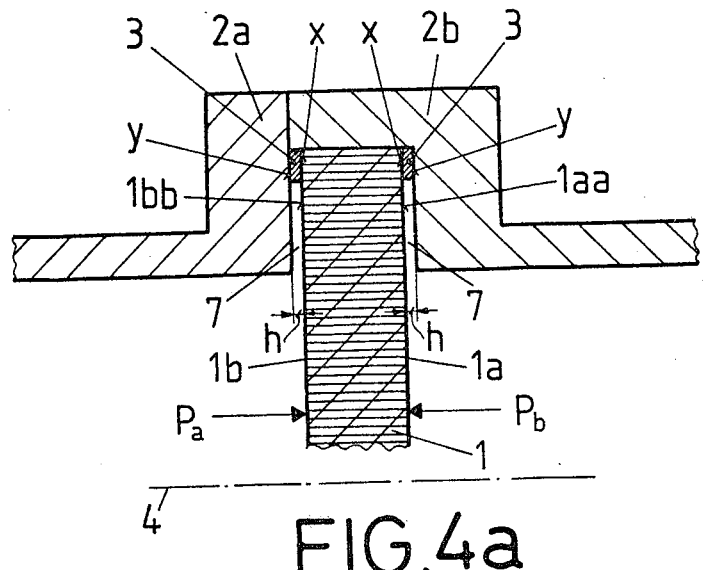
FIG. 4a is a cross-sectional view of a portion of a partition insulator according to the present invention having bearings arranged separately with respect to the partition insulator as well as to the insulator holder.

A further form of construction of a partition insulator, with reference to FIG. 4a, has bearing points (or bearings) 3 arranged separately and between both the partition insulator 1 and the insulator holder 2a, 2b. That is, the bearings 3 are located between both the points x and y (located opposite one another) whereby the configuration or spatial arrangement of the embodiment of FIG. 4a essentially corresponds to that of FIG. 3a. The partition insulator 1 which is constructed in the same manner as in FIG. 3a breaks into a plurality of pieces in the event of a pressure load $P_a$ or $P_b$ corresponding to the bursting strength as in the embodiment according to FIG. 3a.

To better explain, an enlarged bearing point (or bearing) 3 according to the embodiment of FIG. 4a is illustrated in FIG. 4b. Both in FIG. 4a as well as in FIG. 4b, the corresponding parts are again denoted the same as the parts of the previous figures. The bearing point (or bearing) 3 is formed independently of both the partition insulator and the insulator holder. Accordingly, the bearing 3 of FIG. 4b may be of different material (if desired).

Figure 5B:
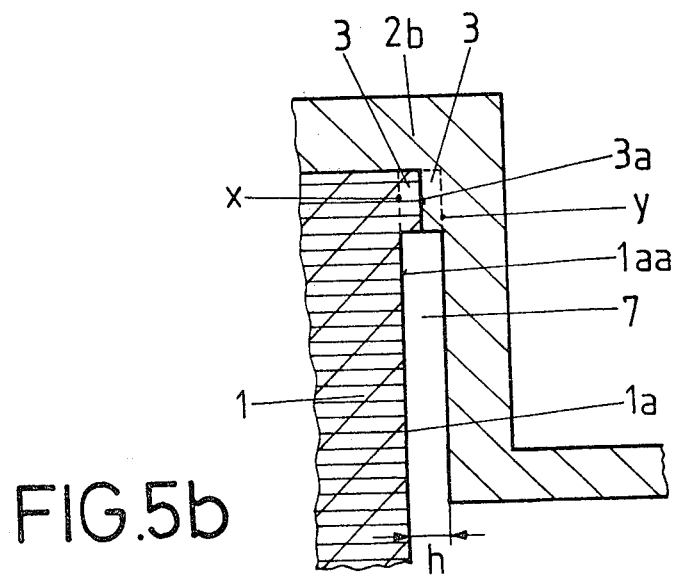
FIG. 5b is an enlarged view of a portion of the partition insulator of FIG. 5a including a bearing point (or bearing)
Figure 5A:
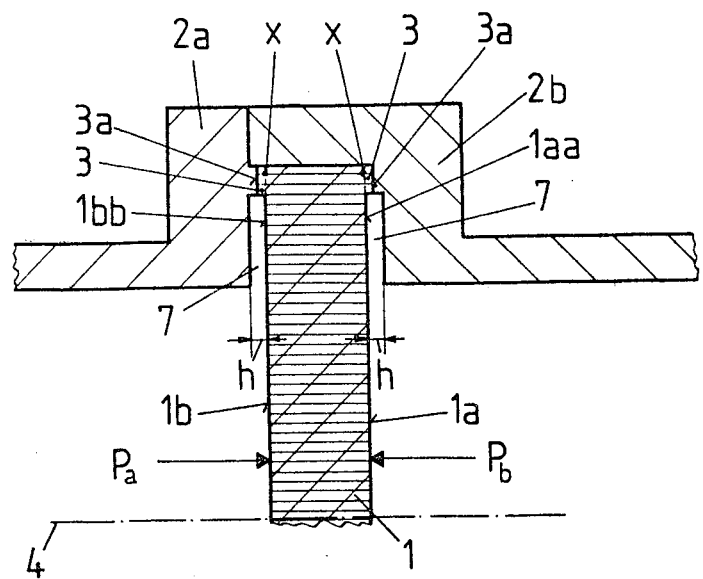
FIG. 5a is a cross-sectional view of a portion of a partition insulator according to the present invention wherein the bearings are arranged partially both on the partition insulator as well as on the insulator holder.

With reference now to FIG. 5a, an embodiment of a partition insulator according to the present invention has bearing points (or bearings) 3 which are arranged both on the points x of edge 1aa of the first front (or bearing) surface 1a as well as on points y of the insulator holder 2a, 2b opposite the points x. The sum of the heights of the bearing points (or bearings) 3 supporting one another at any given time on the open front surfaces 3a corresponds to the height h of the bearing points (or bearings) 3 in the above-mentioned forms of construction, whereby the open slots 7 between the partition insulator 1 and the insulator holder 2a, 2b are again constructed as in the abovementioned embodiments of FIGS. 2 to 4b. In addition, a bursting behavior is provided as in the previously mentioned examples according to FIGS. 2, 3a and 4a.

The bearing point (or bearing arrangement) 3,3 according to FIG. 5a is illustrated in an enlarged manner in FIG. 5b in order to better describe the embodiment of the present invention. The bearing arrangement 3, 3 is formed by a portion made integrally with the partition insulator and by a portion made integrally with each of the members of the insulator holder.

Figure 6:
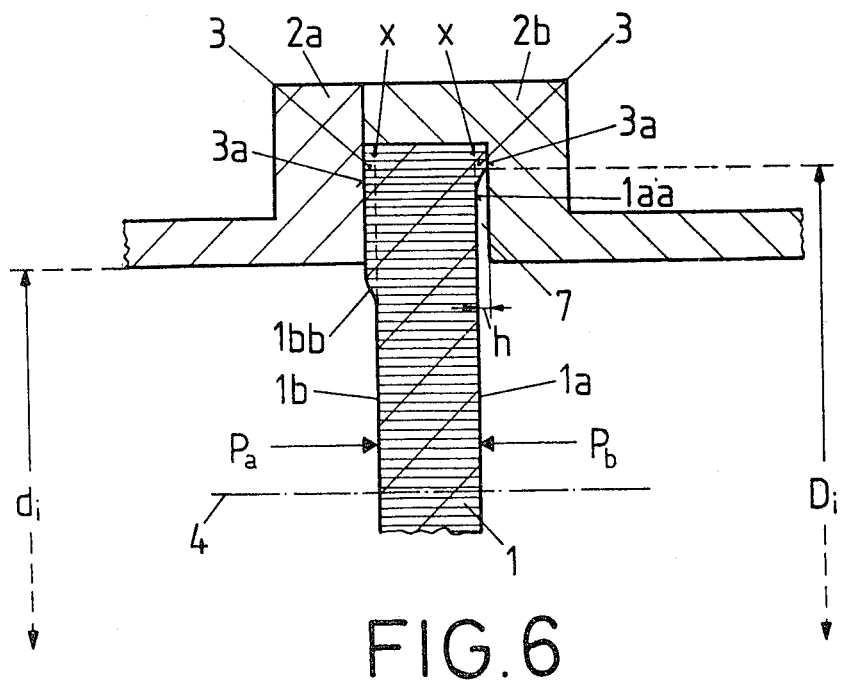
FIG. 6 is a cross-sectional view of a portion of a partition insulator according to the present invention having a relatively large bearing point (or bearing) on the edge of its front (or bearing) surface and a comparatively small bearing point (or bearing) on the edge of its other front (or bearing) surface, the partition insulator being mounted in an insulator holder consisting of two parts.

With reference now to FIG. 6, an embodiment according to the present invention has a bearing point (or bearings) 3 provided at the point x of edge 1aa of the first front (or bearing) surface 1a, (as in the embodiment of FIG. 2). At the point x of the edge 1bb of the second front (or bearing) surface 1b, the bearing point (or bearing) 3 is arranged as in the embodiment of FIG. 1. This embodiment combines within itself (as a function of the direction as well as the quantity of the pressure load $P_a$ or $P_b$) the properties of the forms of construction according to FIGS. 1 and 2. It is again assumed that the quantity of the gas pressure $P_a$ is equally great, however, and oppositely directed to the quantity of gas pressure $P_b$ and that the gas pressure $P_a$ corresponds according to both direction and quantity exactly to the bursting strength of the partition insulator 1. According to the above considerations for FIGS. 1 and 2, it results that the planar annular, open front surface 3a at which the bearing point (or the bearing) 3 contacts the first part 2a of the insulator holder 2a,2b has an annular shape with a considerably smaller open inside diameter $d_i$ than the likewise planar annular open front surface 3a with which the bearing 3 contacts the second part 2b of the insulator holder 2a, 2b (also having essentially an annular shape). If the larger open inside diameter is indicated as Di of the last-mentioned front surface 3a and the smaller open inside diameter is correspondingly indicated as $d_i$ (because the essentially disk-shaped partition insulator 1 cannot be seen as a whole) a different support of the partition insulator 1 is provided by the first part 2a of the insulator holder than by the second part 2b. Therefore, in the case of an equal magnitude but oppositely directed gas pressure $P_a$ and $P_b$ with a unilateral pressure load, provided by $P_b$, the bending of the partition insulator 1 towards the one side, (accordingly the left side in FIG. 6), will become considerably less than the bending toward the other or right side when herewith the partition insulator 1 is unilaterally acted upon by gas pressure $P_a$.

In the case of a specified quantity of gas pressure $P_a = P_b$, the partition insulator will burst or break into pieces with the effect of such a gas pressure or burst pressure $P_a$ whereas, on the other hand, with the effect of an equally great but oppositely directed gas pressure $P_b$, the partition insulator 1 remains undamaged.

Figure 7A:
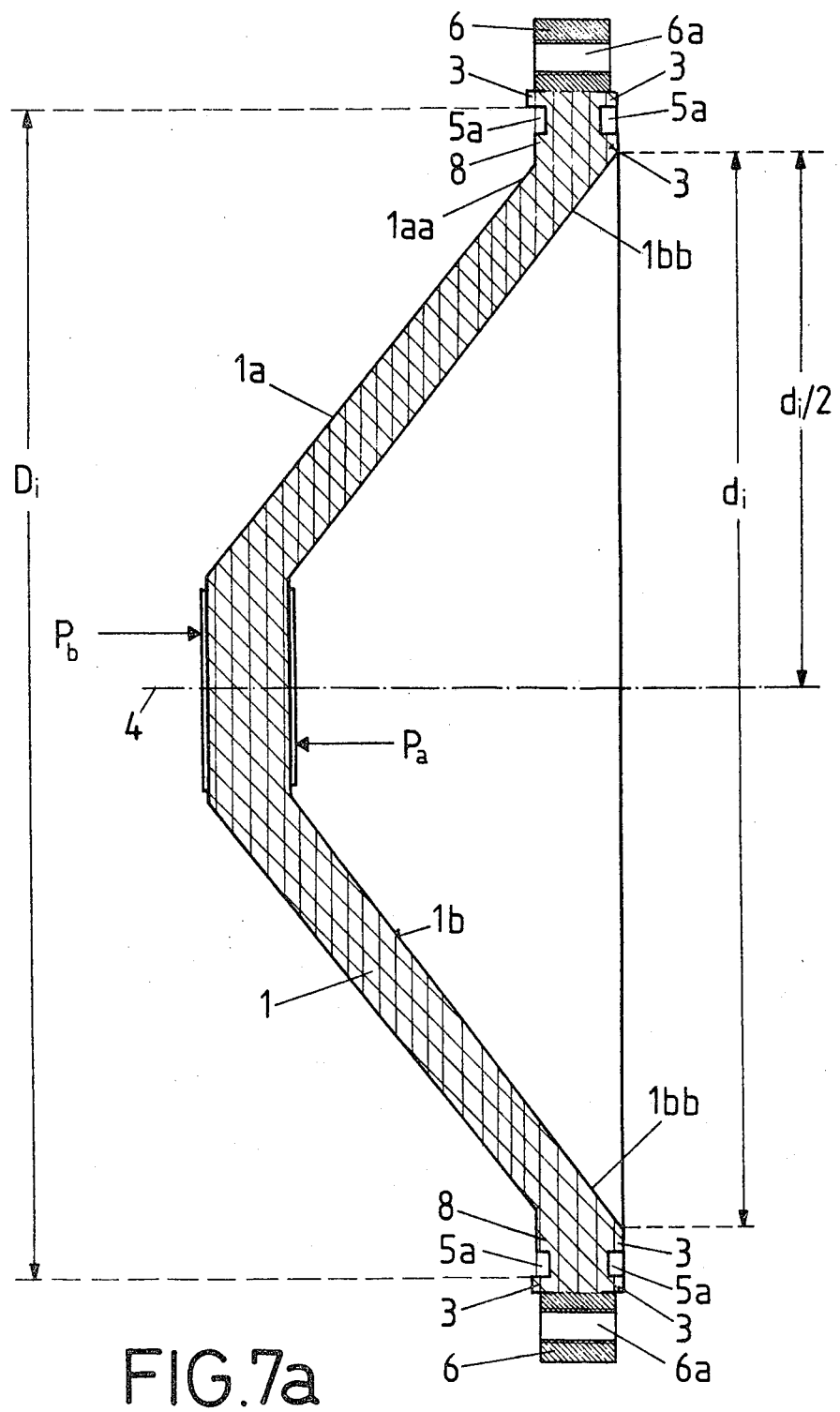
FIG. 7a is a cross-sectional view of a partition insulator according to the present invention having an annular ring provided at a periphery of the partition insulator.

With reference to FIG. 7a, the partition insulator may be essentially cup-shaped to be preferably used in pressurized gas-insulated, metal encased, high-voltage switchgears. The edges 1aa, 1bb of the front (or bearing) surfaces 1a, 1b of the partition insulator 1 are penetrated by annular recesses 5a to provide an at least partial reception of gas-tight seals. A fastening ring 6 is furthermore provided for the partition insulator 1.

The bearing (or bearing points) 3 of the partition insulator 1 according to FIG. 7a are similar to those of the embodiment according to FIG. 6 (already described). On the edge 1bb of the second front (or bearing) surface 1b of the embodiment according to FIG. 6, a single, essentially annular, bearing 3 is arranged having a planar annular open front surface 3a with a relatively smaller open inside diameter $d_i$. In the embodiment of FIG. 7a, however, two mutually concentric annular bearings 3 are arranged at the edge 1bb of the second front surface 1b whereby the smaller annular bearing 3 provides a planar, annular, open front surface 3a having the smaller open inside diameter $d_i$.

For the sake of comparison with the embodiment of FIG. 6, one can imagine two concentric bearings 3 as being one bearing which is divided into two bearings by an annular recess 5a. The recess 5a is then filled by a seal which acts more or less like a bearing (as will be explained in detail below).

Corresponding to the embodiment of FIG. 6, in the case of the embodiment according to FIG. 7a, at the edge 1aa of the first bearing or front surface 1a, there is also arranged a single annular bearing 3 having a relatively larger open inside diameter $D_i$ at its open front surface 3a than at the edge 1bb of the second front surface 1b. Accordingly, it is also true for the embodiment according to FIG. 7a that the partition insulator 1 is further supported on the outside by the bearing 3 at the first front surface 1a. On the other hand, the support provided by the bearing 3 on the second front surface 1b reaches farther towards the inside (or takes place at points located nearer with respect to the axis) of the insulator 1 than that of the first front surface 1a.

Figure 7B:
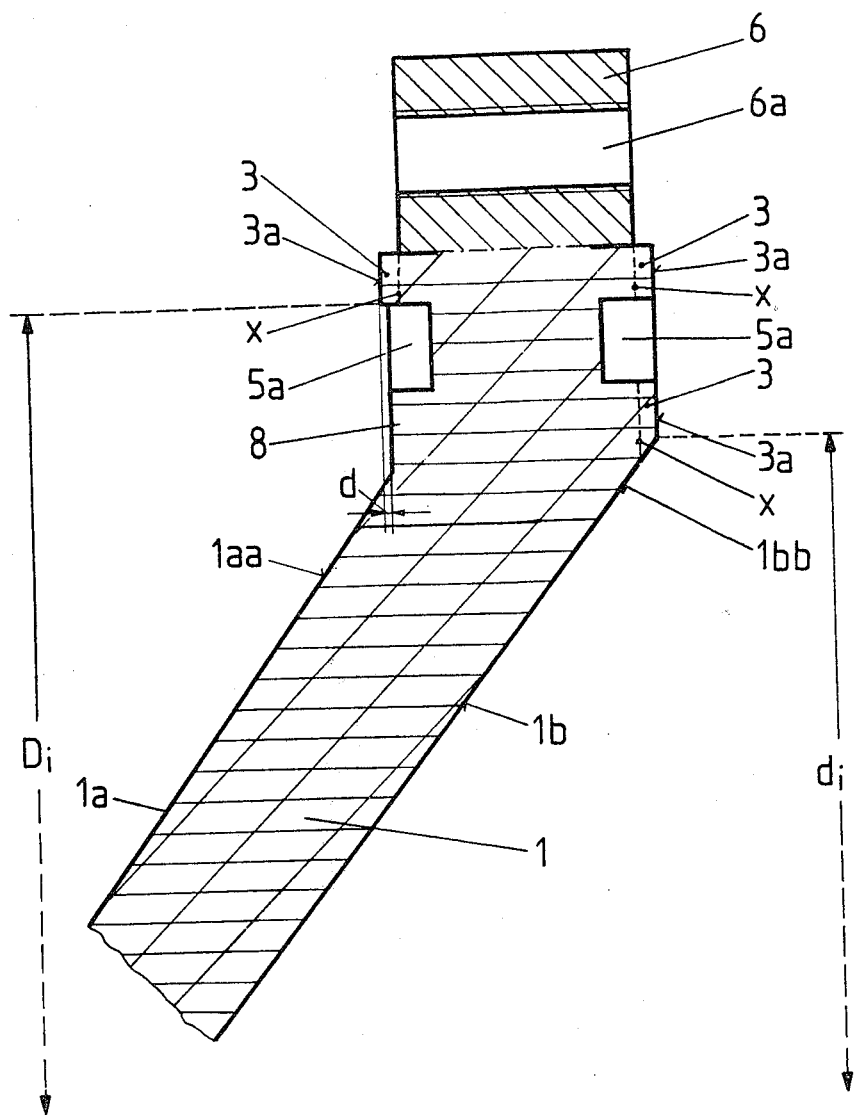

Referring now to FIG. 7b, an upper portion of the embodiment of FIG. 7a includes an insulator reinforcement 8 on the edge 1aa of the first front surface 1a of the partition insulator 1. As can be seen from FIG. 7b, the bearings 3 (which are arranged on the first front surface 1a) extend further outwardly in the axial direction by the difference d than the insulator reinforcement 8 so that the reinforcement can exert no bearing effect. The bearings 3 arranged on the second front surface 1b extend, on the other hand, equally far in an opposite axial direction.

A metal fastening ring 6 is provided with boreholes 6a by which the partition insulator 1 can be fastened to the insulator holder 2a, 2b.

Figure 8A:
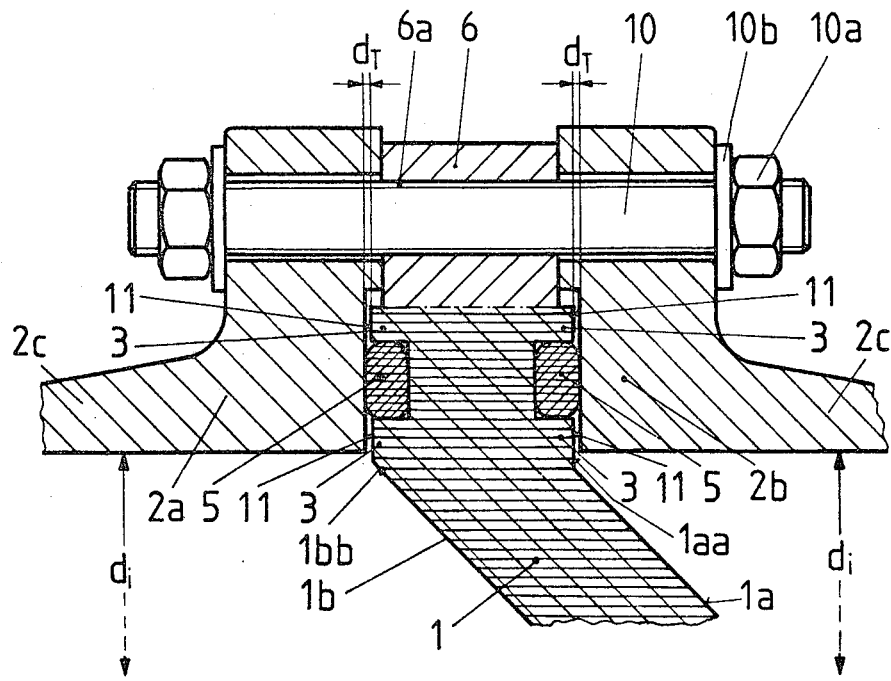
FIG. 8a is an enlarged view of a portion of the partition insulator of FIG. 7a arranged in an insulator holder consisting of two parts and featuring on both edges of the front surfaces of the partition insulator identical bearing points (or bearings)

A partition insulator 1 with reference to FIG. 8a is constructed essentially as in FIGS. 7b or 7a and is provided with an edge zone coupled together with the insulator holder 2a, 2b in corresponding positions (as in the preceding figures). The insulator holder consists of two pipe flanges 2a, 2b with each one of the flanges provided at an end of a corresponding metal pipe 2c, (for example a pressurized gas-insulated metal encased high-voltage switchgear). The pipe flanges 2a, 2b are held together by threaded bolts 10 with nuts 10a. An insert of packing or of spring washers 10b is provided between the actual nut and the respective flange with the ring fastener 6 of the partition insulator 1 being arranged between the flanges 2a, 2b.

A tolerance slot 11 is provided (having an axial extension $d_t$) between the bearings 3 and both the first part of the insulator holder (or first pipe flange) 2a as well as the second part of the insulator holder (or second pipe flange) 2b to provide a gas-tight seal. At least one gas-tight seal member 5 including at least one O-ring is provided between the partition insulator 1 and each of pipe flanges 2a, 2b.

The bearings 3 are constructed alike on both sides of the partition insulator 1 in the embodiment of FIG. 8a. The smaller open inner diameters $d_i$ are equally large (see FIG. 8a) and the seating corresponds essentially to the embodiment of FIG. 1. There is accordingly no difference with respect to the quantity of the bursting strength whether the gas pressure now acts on one or on the other side of the partition insulator.

Figure 8B:
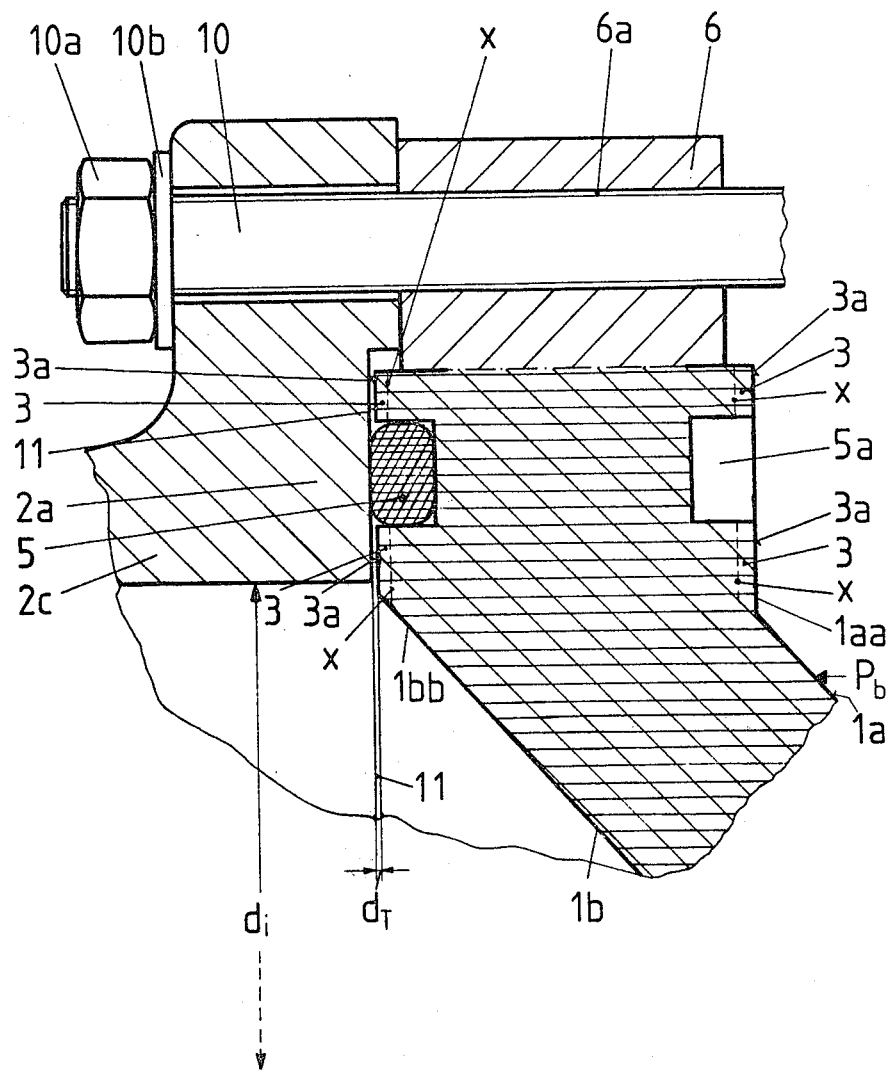
FIG. 8b is an enlarged view of a portion of the partition insulator of FIG. 8a with one part of the insulator holder removed.

If the partition insulator 1 according to FIG. 8a (and accordingly to FIG. 8b) now experiences a corresponding pressure load $P_b$, it follows that both the two bearings 3 and the continuously contacting gas-tight seal 5 will contact and be supported on the first pipe flange 2a. The gas-tight seal 5 corresponds herewith in its effect more or less to a bearing point (or bearing) 3 depending upon the material of the seal. Furthermore, the behavior of the seal 5 depends on how the annular recess 5a is actually constructed in cross-section in order to more or less receive the seal (more particularly, under increased compression).

Figure 9A:
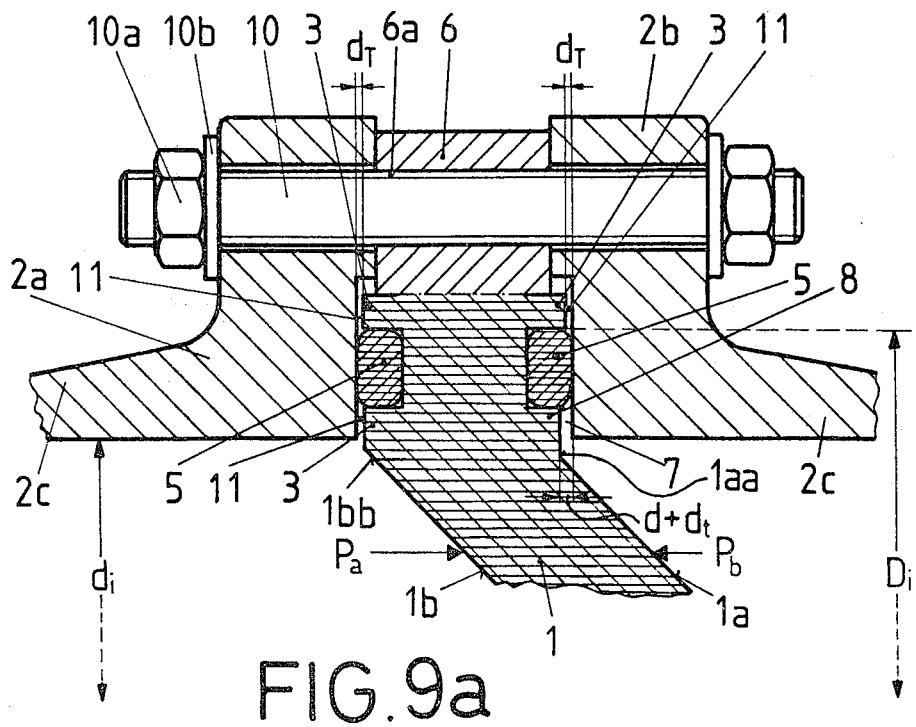
FIG. 9a is an enlarged view of the portion of the partition insulator of FIG. 7a with bearing points or bearings as in the embodiment of FIGS. 7b.

Another embodiment of the partition insulator according to the present invention, with reference to FIG. 9a, has on its first front surface 1a facing the second pipe flange 2b an insulator reinforcement 8 (instead of a bearing 3) which does not participate in the seating of the partition insulator 1. What has already been discussed above is true for the gas-tight seal 5 between the first front surface 1a (or the edge 1aa) and the second pipe flange 2b. Thus, the bearing effect of the correspondingly elastic seals 5 is practically negligible. The embodiment according to FIG. 9a thus corresponds essentially to the embodiment according to FIG. 6 whereby the minimum bursting force $P_a$ is less than the minimum bursting force $P_b$.

Figure 9B:
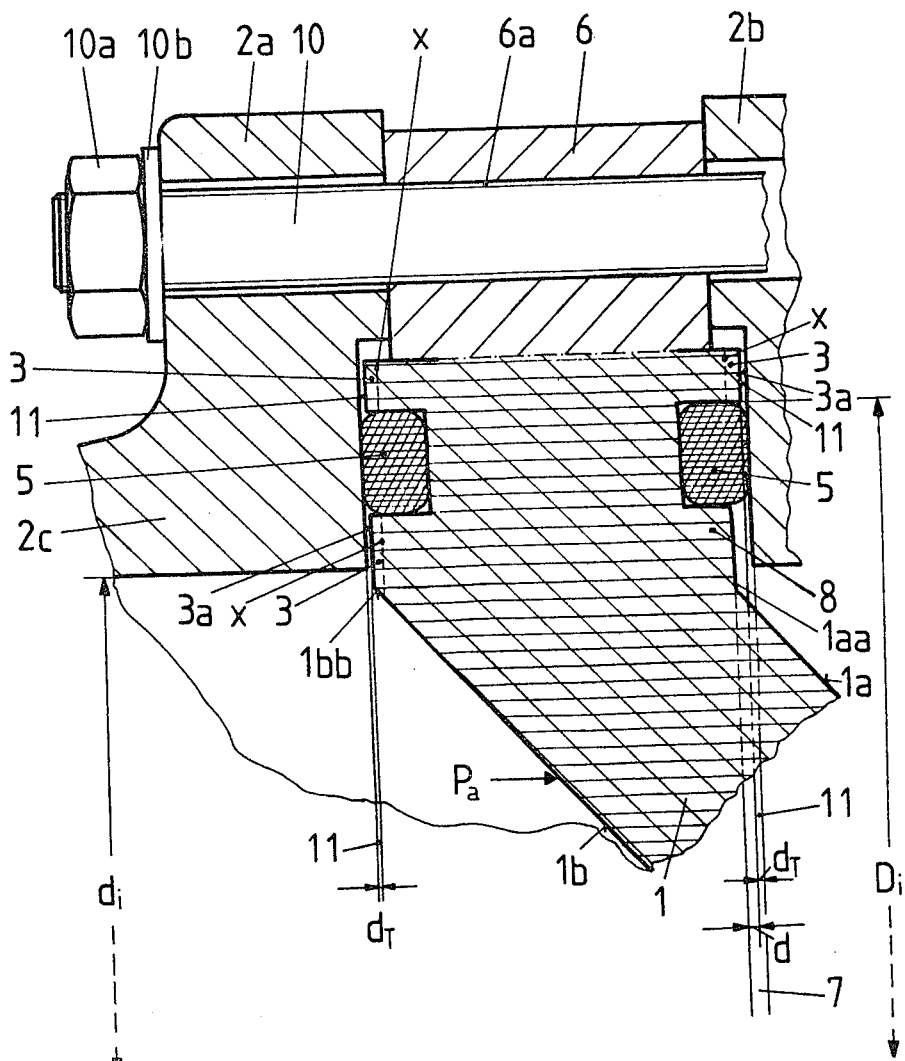

The bearings 3, contacting the first pipe flange 2a (see FIG. 9b) with their open front surfaces 3a, are arranged on the second front surface 1b and distant from the axis 4 of the partition insulator 1 up to a smaller open inside diameter $d_i$ or radius $d_i/2$ (see FIG. 7a). On the other hand, the bearing 3 on the first front surface 1a is supported on the second pipe flange 2b with a greater open inside diameter $D_i$.

If the effect of the gas-tight seal 5 arranged between the first front surface 1a and the second pipe flange 2b is disregarded, it follows that the open slot 7 between the insulator reinforcement 8 and the second pipe flange 2b prevents the partition insulator 1 (in the case of a pressure load $P_a$) from being supported on another bearing point other than on the bearing 3 on the second pipe flange 2b. The open slot 7 has a size which is composed of the axial difference d (between the axial extension of the bearing 3 and the insulator reinforcement 8) and the size $d_T$ (of the tolerance slot 11 between the bearing 3 and the second pipe flange 2b).

If the difference d corresponds to the height h of the bearing 3, it follows that the open slot 7 has a size which results from a consideration of both h and $d_T$. It is possible now to correspondingly change the cross-section of the insulator reinforcement 8 (illustrated in FIG. 9b) and thereby decrease the difference d to zero. In this way, one can change the bearing on the first front surface 1a while producing thereby at least one further bearing point nearer to the center (or axis) 4 (see FIG. 7a) of the partition insulator 1.

In the case of the embodiments of construction illustrated in FIGS. 8a to 9b, there is involved in the insulator holder (or the pipe flanges) 2a, 2b a partition insulator 1 which is supported on the respective insulator holder (or pipe flange) 2a, 2b by the bearings 3 and gripped (or solidly gripped) in the event of a pressure acting on one of the two front surfaces 1a, 1b. Herewith, in FIGS. 8a to 9b, the axial extension $d_T$ of the respective tolerance slot 11 between the members 3 and 2a or 2b is shown in more or less exaggerated scale in order to provide better understanding.

Of course, the shape of the bearings 3 can be constructed otherwise than annular. Furthermore, the invention in its mode of operation is not only releasable by reason of concentrated compression forces P. The partition insulators 1 according to the present invention can, of course, also be released by uniform pressure loads p. Depending on the pressure load P or p as well as on the details of the form (or power) locked bearing (or gripping) of the insulator, various reactions can result with respect to stresses and bending until the insulator finally reaches the predetermined rupture.

The bearing 3 may be formed in either the insulator holder 2a, 2b or the partition insulator 1 by various known methods such as by machining the members after formation and by casting the members in a desired manner.

It is very important in the present invention that an identical partition insulator (used in the most simple way), may, by reason of a varied support and/or gripping, provide a different predetermined rupture behavior in combination with the simplest of structures. In this way, the present invention has enabled one to achieve a considerable technical advance and to overcome technical difficulties existing for many years in a sophisticated manner.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A partition insulator having a predetermined rupture behavior, especially for use in electrical switchgear, comprising:
    a partition insulator member;
    partition insulator holder means for supporting the partition insulator member at an edge of the partition insulator member;
    a first bearing provided between a first face of the partition insulator member and the partition insulator holder means; and
    a first open slot provided between said first face of the partition insulator member and said partition insulator holder means, said first open slot having an extent corresponding to a predetermined rupture pressure of the partition insulator member.

2. The partition insulator of claim 1 further comprising:
    a second bearing provided between a second face of the partition insulator member and the partition insulator holder means, said first and second bearings being substantially opposite one another with respect to the partition insulator member.

3. The partition insulator of claim 2 wherein the first bearing and the second bearing are both formed integrally with the partition insulator member.

4. The partition insulator of claim 2 wherein the partition insulator member is generally symmetrical about a central axis.

5. The partition insulator of claim 4 wherein the partition insulator member is generally cup-shaped.

6. The partition insulator of claim 5 wherein the first bearing and the second bearing are arranged at different radial distances from the central axis.

7. The partition insulator of claim 2 wherein the first bearing and the second bearing are both formed integrally with the partition insulator holder means.

8. The partition insulator of claim 2 wherein the first bearing and the second bearing are each both partially formed integrally with the partition insulator holder means and partially formed integrally with the partition insulator member.

9. The partition insulator of claim 2 wherein the first bearing and the second bearing are each formed separately from both the partition insulator member and the partition insulator holder means.

10. The partition insulator of claim 2 further comprising:
at least one gastight seal means provided between the partition insulator member and the partition insulator holder means.

11. The partition insulator of claim 10, wherein the gas-tight seal means includes at least one O-ring provided in a cavity of the partition insulator member and arranged between the partition insulator member and the partition insulator holder means.

12. The partition insulator of claim 2, further comprising a second open slot provided between said second face of the partition insulator member and said partition insulator holder means.

13. The partition insulator of claim 12, wherein the first and second open slots have different radial extents whereby one side of said partition insulator member may be subjected to a greater pressure than the other side of the partition insulator member without bursting.

14. The partition insulator of claim 2, wherein the partition insulator member is substantially circular and the partition insulator holder means includes first and second holder members provided on opposite sides of the partition insulator member, the partition insulator further comprising:
ring means encircling the partition insulator member, the ring means including a ring member having at least one bore receiving a bolt, the bolt also passing through corresponding bores of the first and second holder members.

15. The partition insulator of claim 1, wherein said first open slot is provided adjacent said first bearing and said first bearing has an axial thickness substantially equal to an axial thickness of said first open slot.

* * * * *